(12) United States Patent
Müller et al.

(10) Patent No.: US 7,718,300 B2
(45) Date of Patent: May 18, 2010

(54) FRAME ELEMENTS FOR MONOPOLAR FUEL CELL STACKS

(75) Inventors: Jens Müller, München (DE); Markus Huber, Grafing (DE); Christian Ruf, München (DE)

(73) Assignee: SFC Smart Fuel Cell AG, Brunnihal-Nord (DE)

( * ) Notice: Subject to any disclaimer, the term of this patent is extended or adjusted under 35 U.S.C. 154(b) by 1148 days.

(21) Appl. No.: 10/538,601

(22) PCT Filed: Jul. 15, 2003

(86) PCT No.: PCT/EP03/07654

§ 371 (c)(1),
(2), (4) Date: Dec. 27, 2005

(87) PCT Pub. No.: WO2004/054024

PCT Pub. Date: Jun. 24, 2004

(65) Prior Publication Data

US 2006/0127741 A1 Jun. 15, 2006

(30) Foreign Application Priority Data

Dec. 11, 2002 (EP) .................................. 02027645

(51) Int. Cl.
*H01M 8/02* (2006.01)
*H01M 8/04* (2006.01)
*H01M 8/24* (2006.01)
*H01M 8/10* (2006.01)

(52) U.S. Cl. ......................................... 429/38; 429/34

(58) Field of Classification Search ............. 429/34–40
See application file for complete search history.

(56) References Cited

U.S. PATENT DOCUMENTS

| 5,750,281 A | * | 5/1998 | Washington et al. .......... 429/39 |
| 6,432,569 B1 | * | 8/2002 | Zeilinger et al. ............... 429/23 |
| 2002/0142209 A1 | * | 10/2002 | Kikuchi et al. ................. 429/34 |
| 2003/0175574 A1 | | 9/2003 | Dohle et al. |

FOREIGN PATENT DOCUMENTS

| JP | 05242904 A | 9/1993 |
| JP | 2000182654 A | 6/2000 |
| JP | 2002280016 A | 9/2002 |
| JP | 2002298901 A | 10/2002 |
| WO | WO-9957781 A1 | 11/1999 |
| WO | WO-0217417 A2 | 2/2002 |

\* cited by examiner

*Primary Examiner*—Dah-Wei D Yuan
*Assistant Examiner*—Amanda Barrow
(74) *Attorney, Agent, or Firm*—IP Strategies

(57) ABSTRACT

The present invention relates to frame elements for monopolar fuel cell stacks, permitting a simplified electrical wiring and/or a simplified and improved assembly of monopolar fuel cell stacks. They permit a significant miniaturization of monopolar arrangements.

21 Claims, 8 Drawing Sheets

220

FRAME ELEMENTS FOR MONOPOLAR FUEL CELL STACKS

The present invention relates to frame elements used for monopolar fuel cell stacks, which together with special plate elements permit a simplified electrical wiring and/or a simplified and improved assembly of monopolar fuel cell stacks.

BACKGROUND OF THE INVENTION

With the advent of bipolar plates, monopolar fuel cell stack assemblies considerably fell behind because of their complicated wiring in comparison with bipolar assemblies. This shall now be explained with reference to FIG. 1 on the basis of fundamental differences between a bipolar arrangement and a monopolar arrangement.

FIG. 1 shows schematic equivalent circuit diagrams of two equivalent series connections of individual voltage cells, the upper part of the figure representing a bipolar arrangement and the lower part of the figure a monopolar arrangement. In the bipolar arrangement the voltage cells are oriented such that a plus pole is opposite to a minus pole each time, which permits an easy wiring of the voltage cells. By contrast, in the monopolar arrangement the cells are oriented such that two plus poles or two minus poles are opposite in pairs each time. To connect the individual voltage cells in series, a comparatively troublesome wiring is needed, which partly explains why the bipolar arrangement has often been preferred considerably.

Irrespective of this, the monopolar arrangement certainly offers advantages over the bipolar arrangement. These shall now be explained hereinafter:

In bipolar stacks the cathode region of an individual cell is separated from the anode region of the directly neighboring individual cell by a separation plate (bipolar plate). In the stack said separation plates account for a large portion of the total stack volume which, based on the stack volume, deteriorates typical characteristics such as performance, etc. This drawback does not arise in a monopolar stack because two neighboring individual cells can here comprise a joint anode portion or cathode portion. Although the two anodes or cathodes of such a joint anode or cathode portion must be electrically isolated from one another, the fluid portions themselves need not be separated as long as the electrical conductivity of the cathode and anode fluids remains negligible, which (despite a certain conductivity, especially of the anode fluid) is normally the case.

The electrical wiring of monopolar stacks is carried out in the prior art either via direct contacting of the current discharging means by soldering ("direct adjoining soldering") or by mounted contact terminals. The stack is clamped via the end plates by means of screws, tightening bands, or the like. As a consequence, current discharging means of different geometries or of a complicated wiring are required for a stack in the prior art. This is very disadvantageous in terms of assembly and proneness to assembling mistakes and is cost-intensive (e.g. several stamping tools are needed for different current discharging means). In addition, the former types are not suited for miniaturized fuel cell systems because they require a lot of constructional space. The usual clamping of the stack by means of screws requires a large minimum thickness of the end plates for realizing appropriately deep threaded bores. In other techniques, too, e.g. clamping by way of tightening bands, the end plates must absorb very great forces and therefore require a certain thickness for reasons of stability. On the whole, former clamping techniques are difficult and require a large volume and are thus hardly suited for miniaturized fuel cell systems.

BRIEF SUMMARY OF THE INVENTION

It is an object of the present invention to provide frame elements with which the above-described drawbacks of the monopolar arrangement of fuel cell stacks, especially the problems arising during manufacture of the stack, are avoided.

Furthermore, it is an object of the present invention to simplify and improve the tightening or clamping of fuel cell stacks.

These objects are achieved by the inventive frame element comprising the features of claim 1 and by the method comprising the steps of claim 7.

Advantageous developments are indicated in the subclaims. Particularly preferred embodiments are described with reference to the attached figures.

The frame element according to the invention comprises a plurality of recesses for accommodating ribs of plate elements which are arranged to form a stack, particularly plate elements according to the invention, and/or a plurality of perforations for passing therethrough ribs of the plate elements arranged to form the stack.

The frame element is also substantially plate-shaped. The component "plate" has just been omitted in the designation to avoid confusion with the plate elements which in the stacked arrangement form the stack.

Depending on the configuration of the frame elements, two different frame elements may also be provided for building up the stack, the (primary or single) function of the one type being the mechanical clamping of the stack and the (primary or single) function of the other type being the electrical wiring of the stack.

However, it may be that only one type of frame element is needed which is useful for the electrical wiring and also simplifies the assembly of the stack and may be conducive to the mechanical properties thereof (strength, tightness, etc.).

If both recesses and perforations are provided in the frame element, the recesses in the frame element preferably serve to mechanically clamp the stack, whereas the perforations in the frame element preferably serve the electrical wiring of the stack. The ribs are passed from one side of the frame element through the perforations so that they project at the other side of the frame element. In accordance with the requirements of the monopolar wiring they can here be interconnected in an electrically conductive manner.

The frame elements of the invention are used together with specifically configured plate elements which serve fluid conduction into the individual cells of a stack (optionally also in a direction perpendicular thereto, i.e. in stack direction). The inventive frame elements serve the electrical wiring and/or the assembly of a plurality of plate elements that are arranged to form a stack. Both plate elements and frame elements have, in general, much smaller dimensions in one direction in space than in the two other directions in space that are perpendicular thereto. Starting from unstructured plate-shaped basic materials, they can be produced in a simple and inexpensive manner because they can be structured by way of easily automatable processes such as stamping, embossing, milling, photolithography, etc.

Furthermore, for simplifying the electrical wiring of monopolar stacks a configuration of the plate elements turns out to be of advantage that with a congruent overlap of the plan views of two plate elements permits at least an arrangement in which the ribs of the two superposed plate elements are offset relative to one another. As a result, the plate elements can be stacked such that the electrical wiring can be carried out in a simplified way with the next neighbor but one.

It is decisive for the operability of the monopolar stack that in the assembled stack the two anodes of an anode portion or the cathodes of a cathode portion are not interconnected in an electrically conductive manner.

Such portions may be formed by electrically conductive plate elements which are oriented in pairs and which are isolated from one another by a correspondingly structured, electrically insulating layer, which is for example accomplished in an easy manner in that metal plates which are insulation-coated at one side (or insulating plates which are metal-coated at one side) are used for producing the plate elements.

As will be explained later, plate elements are preferably used having two electrically conductive surface layers that are isolated from each other by an intermediate layer. An individual anode portion (or cathode portion) which comprises the anodes (or cathodes) of two adjoining cells can then be formed by a single plate element which comprises an insulating core and is coated at both sides in an electrically conductive manner, said electrically conductive layers being isolated from each other.

Hence, said plate elements can be made from laminated start plates of the conductive-insulating type or of the conductive-insulating-conductive type. However, they may also be made from conductive (metallic) start plates that will only be insulation-coated (e.g. lacquered) after structuring, or they are made from insulating start plates which will only be coated in an electrically conductive manner (e.g. by evaporation) after structuring.

It is possible to simplify the manufacture of monopolar stacks even further when constructional stack units are provided that comprise an MEA-plate element combination, a membrane electrolyte unit (MEA) being connected to a conductive side of a plate element. Alternatively, the constructional stack units used may also be MEA-plate element-MEA combinations which can then be used in an alternating sequence together with simple plate elements for building up the stack. The connection of MEA and plate element that has been established before the build-up of the stack can yield enhanced tightness, a more precise arrangement, a lower internal resistance and, last but not least, a higher mechanical stability than in the case where individual elements are used.

For simplifying the electrical wiring of the stack the frame element is preferably provided at one side with a structure that is electrically conductive in portions and supports a monopolar wiring of the plate elements arranged to form the stack. In the simplest case the ribs of the plate elements that have been inserted or passed through must only be soldered with the respectively adjoining portion of the electrically conductive structure to achieve a monopolar wiring.

The structure which is electrically conductive in portions can be obtained by forming a regular two-dimensional pattern of conductive and insulating portions, which permits the advantageous use of printed circuit boards and lithographic techniques. In this case the electrical connection between the ribs of the frame elements that serve to conduct current and the conductive regions can be automated in a simple way. Optionally, the complete assembly and wiring of the monopolar stack can be automated as well.

Preferably, the frame element comprises mounting means for two end plates of the stack which complete the stack of plate elements at both sides. For instance, a fluid-tight monopolar arrangement which by connection of the mounting means of the frame element to corresponding means of the end plates can be brought into the mechanically stable end shape of the stack can then be provided by pre-tensioning the stacked arrangement of plate elements (and seals, MEAs) by means of the stack end plates to be provided at both sides. This can be carried out in the simplest case by just mounting the inventive frame elements on the ribs, as will be explained later with reference to a particularly preferred embodiment.

In an advantageous development, the frame element of the invention comprises at least one channel for fluid conduction along a stack axis of the monopolar stack. This development will be of advantage when the plate thickness of the frame element is adequately large for fluid conduction, so that a channel can be embossed or milled (open groove) or drilled (bore) into the frame element. A bore can also be obtained when the frame element is composed of two half elements with suitably oriented grooves.

The method of the invention for producing a fuel cell stack comprises the steps of arranging plate elements in a stack arrangement; pre-tensioning the plate elements; laterally mounting frame elements of the invention on the stack so that the recesses and/or the perforations of the frame elements receive ribs of the plate elements; and offsetting the pretension.

The recesses and/or the ribs absorb the pre-tensioning forces at least in part when the pretension is eliminated. This effect and the whole mechanical stability can even be improved when the ribs of the plate elements are soldered with the frame elements before the pretension is eliminated.

BRIEF DESCRIPTION OF THE DRAWINGS

The invention will now be described by way of examples and particularly preferred embodiments of the elements of the invention with reference to the attached figures, of which

DETAILED DESCRIPTION OF THE INVENTION

Figure 1:
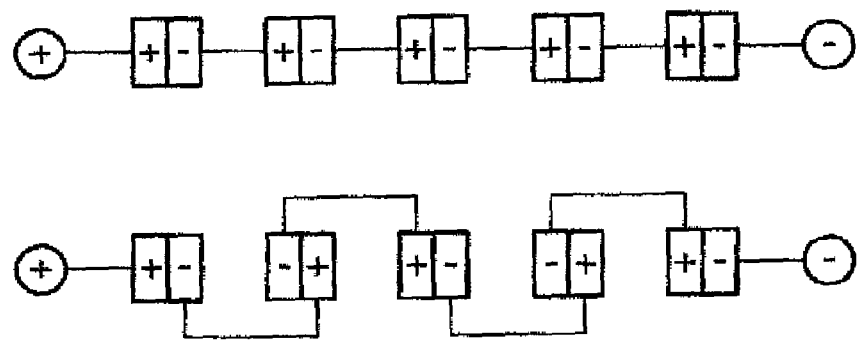
FIG. 1 shows the qualitative difference in the electrical wiring of a bipolar arrangement and a monopolar arrangement.

FIG. 1 shows the basic differences in the electric wiring (series connection) of individual cells in a bipolar arrangement (top) and a monopolar arrangement (bottom). It has already been described in detail in the introductory part, so that this need not be repeated.

Figure 2:
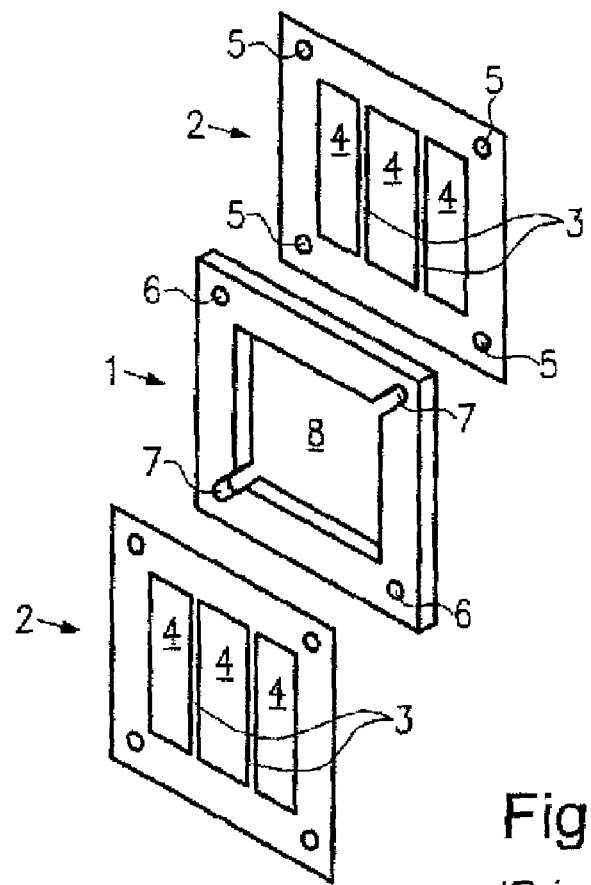
FIG. 2 shows a fluid chamber for a monopolar arrangement according to the prior art.

FIG. 2 shows a cutout from a monopolar stack according to the prior art as described in a similar form e.g. in DE 100 40 654 A1. This document also describes means for the mounting and electrical wiring of the stack, which for the sake of a simplified illustration are not shown in FIG. 2.

An electrically insulating frame 1 is sandwiched between two current collectors 2. The current collectors, in turn, adjoin electrolyte means (MEA) (not shown in the figure). The current collectors 2 serve to discharge current on the boundary MEA-current collector, but at the same time they should not significantly reduce the contact surface of the anode fluid with the MEA. Therefore, the inner region of a current collector 2 is bridged with thin transverse webs 3 which have an adequate width and are present in an appropriate number for discharging current, but are so small that they do not significantly reduce the active contact surface of the fluid with the MEA as defined by the perforations 4.

For flow conduction along the stack axis four bores 5 are provided in the frame region (here in the corners) of the current discharging means, two diametrically opposed bores serving to conduct the anode fluid and the cathode fluid, respectively. Corresponding bores 6, 7 are also provided in the frame 1. The bores 7 communicate via through openings with the inner region 8 of the frame 1. Anode fluid is supplied into the inner region 8 via one of the two bores 7 and is discharged through the other, diametrically opposed bore 7. The inner region 8 constitutes the main volume of the anode chamber of the illustrated cell because the thickness of the frame 1 is much greater than that of the current collector 2.

The statements made on the anode chamber apply by analogy to the cathode chamber. In a cathode chamber, the central frame has perforations on the two other diametrical fluid passages. To this end the sketched type of frame 1 must only be rotated and stacked in alternating sequence, so that only one type of frame is needed for building up the stack.

As has already been mentioned, FIG. 2 does not illustrate means for the assembly and electrical wiring of the stack. For the purpose of electrical wiring each insulating frame is provided according to DE 100 40 654 with a through opening and each current collector with a through opening and with a conductive lug which can be swung out of the plane. Said through openings and lugs cooperate within the stack such that a monopolar wiring of the stack, which corresponds to FIG. 1, lower part, is ensured.

In the following, only the features that are essential for the invention shall be outlined for describing the invention. To be more specific, no MEA units are shown for the sake of simplicity. It is self-evident for the experts familiar with this technical field that these units for forming an individual cell must be provided between anode and cathode each time. This can be done when the stack is assembled, but also by the measure that, instead of simple plate elements, constructional units consisting of plate element and MEA unit are already provided before assembly.

The two FIGS. 3 and 4 shall now be described.

Figure 3:
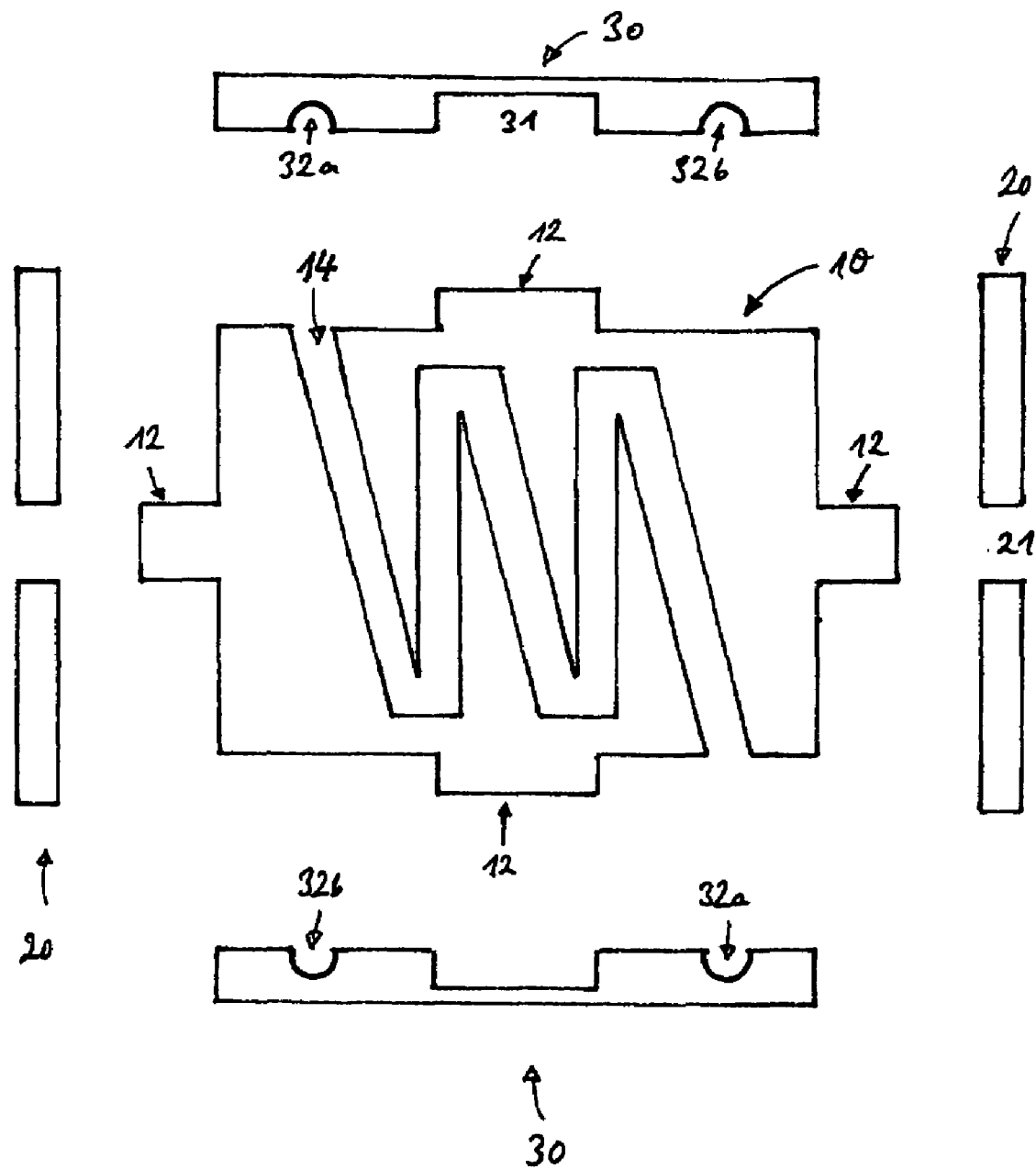
FIG. 3 is an exploded view of a monopolar stack (viewed in stack direction) which is composed of plate elements and of frame elements according to the invention.

FIG. 3 is an exploded view showing a monopolar stack which is composed of plate elements and inventive frame elements.

The viewing direction corresponds to the stack direction, so that only one plate element 10 (in top view) is visible. FIG. 4 shows the two different frame elements 20, 30 of the invention that are used in the arrangement of FIG. 3, in top views (bottom), and the associated views of the cross sections (top).

The plate element has a flow conduction structure in the plane defined by the plate element and at least one rib extending in the plane defined by the plate element from a side portion of the plate element to the outside.

The flow conduction structure may e.g. be formed by a coherent perforation structure which has a plurality of channels extending side by side (for instance in parallel) or also an individual meandering channel. The ribs serve either the assembly of the monopolar stack or the electrical wiring of the monopolar stack. However, they may also serve both purposes at the same time.

The plan view of the plate element defined by the side portion of the plate element (i.e. without ribs) is preferably rectangular with a view to simple assembly. A hexagonal or octagonal shape might also be of advantage. The decisive point is that at least two different orientations (for anode and cathode) with congruent plan views exist for the plate element.

If there is a single rib, said rib in cooperation with the frame element according to the invention primarily serves the electrical wiring of the monopolar stack. However, it may also contribute to a simplified assembly and possibly to increased stability of the assembled stack. When there are several ribs, the tasks may also be distributed, so that one rib (or several ribs) is used for electrical wiring and another rib (or several other ribs) for increasing mechanical stability. It is advantageous for both aspects, namely current conduction and mechanical strength, when the plate element comprises at least two ribs that in the plane defined by the plate element extend from different, preferably opposite, side portions of the plate element to the outside.

The plate element 12 is subdivided by a meandering channel 14 into two half plates. To fix the half plates in space, ribs 12 are provided at different sides, the ribs being accommodated by corresponding recesses 21, 31 of frame elements 20, 30.

Figure 4:
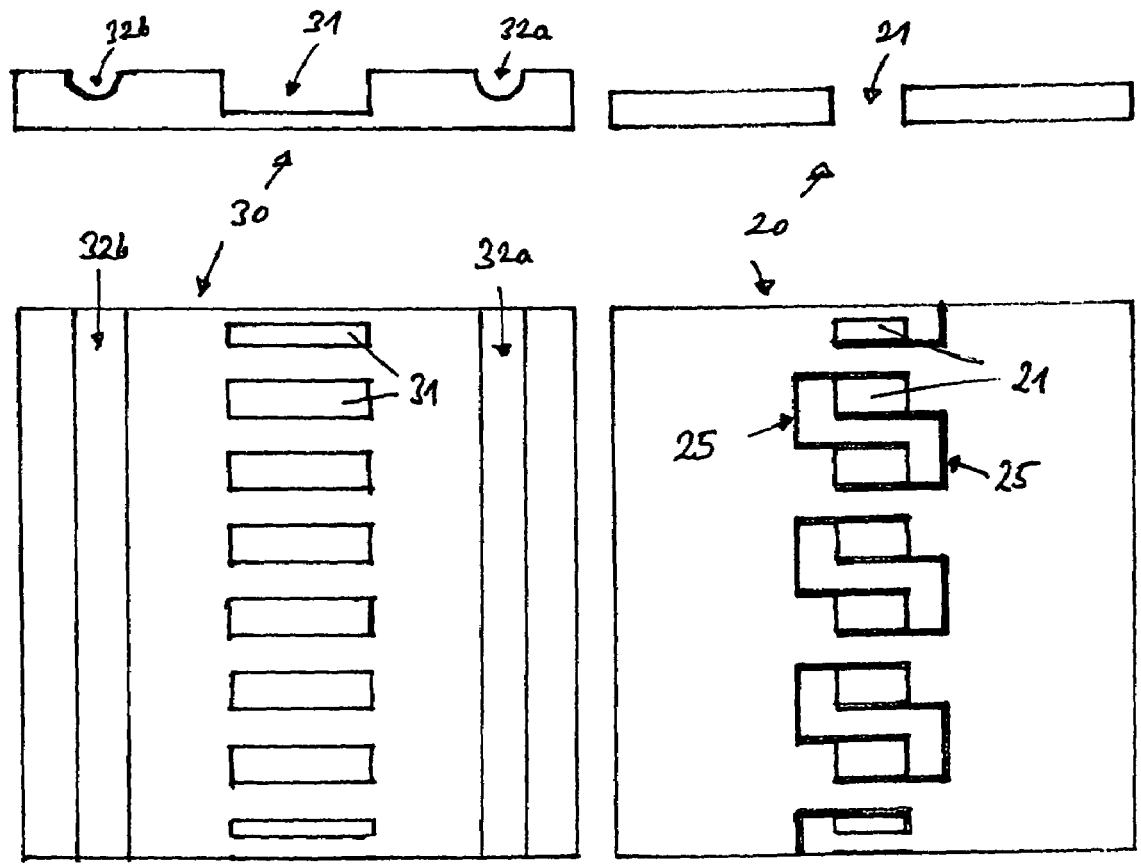
FIG. 4 shows top views (bottom) on the two inventive frame elements used in FIG. 3, and the associated views of the cross sections (top)

In the present embodiment, the frame element 20 which is shown in a top view in FIG. 4 (bottom, right side) primarily serves the electrical wiring of the monopolar stack. The stack is formed in the present example by two individual plate elements 10 at the stack end and by six intermediate pairs of plate elements 10. The ribs 12 which are laterally provided in FIG. 3 serve the electrical wiring and penetrate through the perforations (recesses) 21 of the laterally disposed frame elements 20, namely individually in the two perforations 21 provided at the end side and in pairs therebetween. They are soldered with conductor sections 25 (the individual conductor sections 25 have no contact with one another), thereby effecting an electrical wiring corresponding to the one shown in FIG. 1, bottom. A side effect of this soldering process is the increased mechanical strength of the stack construction.

The frame elements 30 provided at the top and bottom serve mechanical stability and fluid transportation along the stack axis, and fluid supply and discharge, respectively, into channels 14 and from channels 14, respectively, of the anode region and the cathode region, respectively. For ease of manufacture and increased mechanical stability the frame elements 30 have provided therein recesses 31 into which the ribs 12 of the plate element 10 can be inserted that are provided at the top and bottom. For the conduction of the anode fluid and the cathode fluid, respectively, two grooves 32a (for the anodes) and two grooves 32b (for the cathodes) are provided that can be aligned with the ends of the channels 14. The plate element 10 which is sketched in FIG. 3 thus represents an anode region in this orientation. For use with cathodes it is employed with an orientation in which it is rotated about the horizontal or vertical central axis by 180°.

The frame elements 20, 30 shown in FIG. 4 are used for a configuration of the plate elements 10 in which the latter are used in pairs for forming an anode region with two anodes (or cathode region with two cathodes).

When frame elements are used in accordance with the structuring of FIG. 3, but with conductive surfaces at both sides, only one frame element 10 would be needed for each pair of anodes and each pair of cathodes. In this instance all of the openings 21, 31 of the frame elements 20, 30 of FIG. 4 would have to be configured with the same size and provided at equal distances, which apart from the reduced number of required plate elements would mean a further simplification of the stack construction. Therefore, such a development is generally preferred over the sketched configuration.

Figure 5:
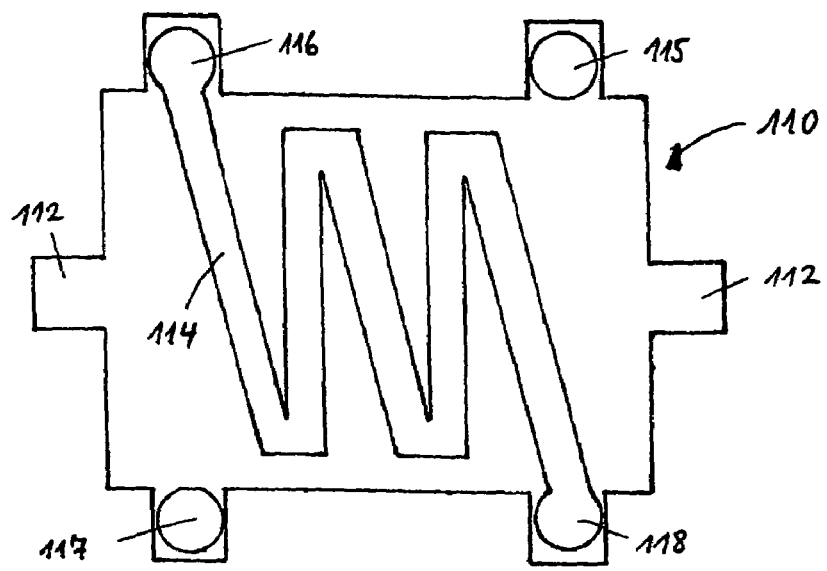
FIG. 5 shows a further plate element which can be used together with the inventive frame elements.
Figure 6:
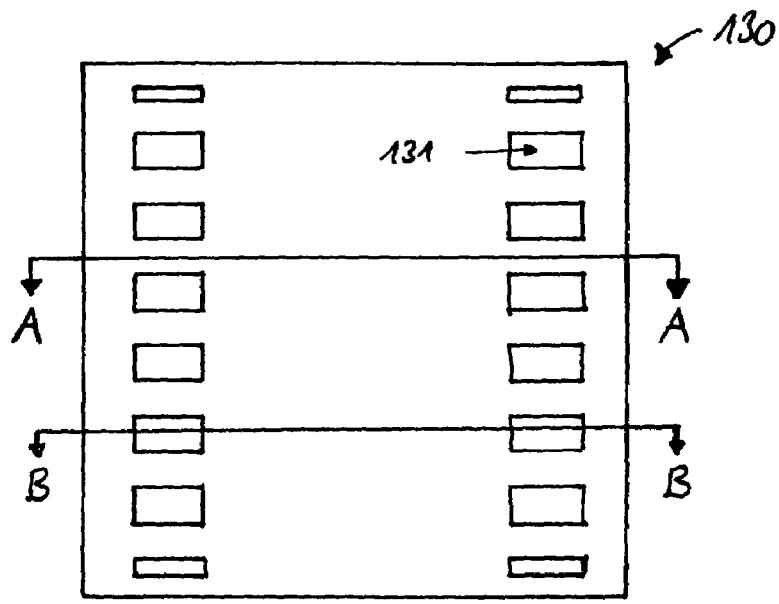
FIG. 6 shows a top view (top) on a frame element of the invention which can be used together with that in FIG. 3, and the accompanying views of the cross sections (bottom) at two different positions along the longitudinal direction of the frame element.
Figure 6:
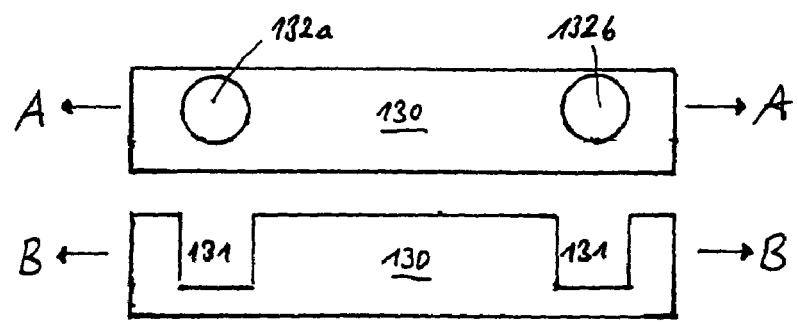

FIGS. 5 and 6 show further plate elements and preferred embodiments of correspondingly configured inventive frame elements.

The plate element 110 sketched in FIG. 5, top, is similar in its structure to the plate element 10 sketched in FIG. 3, but in contrast to that of FIG. 3 it is configured as one piece.

For the electrical wiring of a stack of said plate elements 110 the same plate elements 20 are used as sketched in FIGS. 3 and 4. Furthermore, it differs from the frame element of FIG. 3 in that, instead of individual ribs 12 provided in the plate element 10 at the top and bottom, there is provided a pair of ribs that also serve to conduct fluid. To this end each of said ribs comprises a bore 115 to 118, each of these bores serving to conduct fluid along the axis of the stack, and bores 116 and 118 additionally serve the supply or discharge of fluid into/from the flow channel 114.

The frame element 130 to be used, which is sketched in FIG. 5 in the lower part of the figure in a top view and in two cross-sections, is configured accordingly: It comprises two continuous bores 132a and 132b in longitudinal direction (stacking direction of the stack) that are periodically interrupted by recesses 131. With the insertion of the ribs of the plate element 110 into said recesses 131 four continuous fluid channels are formed along the stack axis.

In the stack configurations of FIGS. 3 to 6, two different frame elements are used that together with two stack end plates (not shown) form a housing which completely encloses the stack.

The construction of monopolar fuel cell stacks can be further simplified when the plate element is configured as a laminate of an insulating layer and of two conductive layers sandwiching the insulating layer. The pairwise arrangement of plate elements is here not needed because a single plate element can comprise the two electrodes (anodes or cathodes) of an anode or cathode region of two adjoining individual cells. For the construction of the stack electrolyte units and plate elements are simply stacked in alternating fashion. Such plate elements are used for the examples described in FIGS. 7 to 11. However, the inventive plate elements 10 and 110 of FIGS. 3 and 5 can also be configured in such a way; the recesses 31, 131 and perforations 21, respectively, of associated frame elements must here be adapted accordingly.

Figure 7:
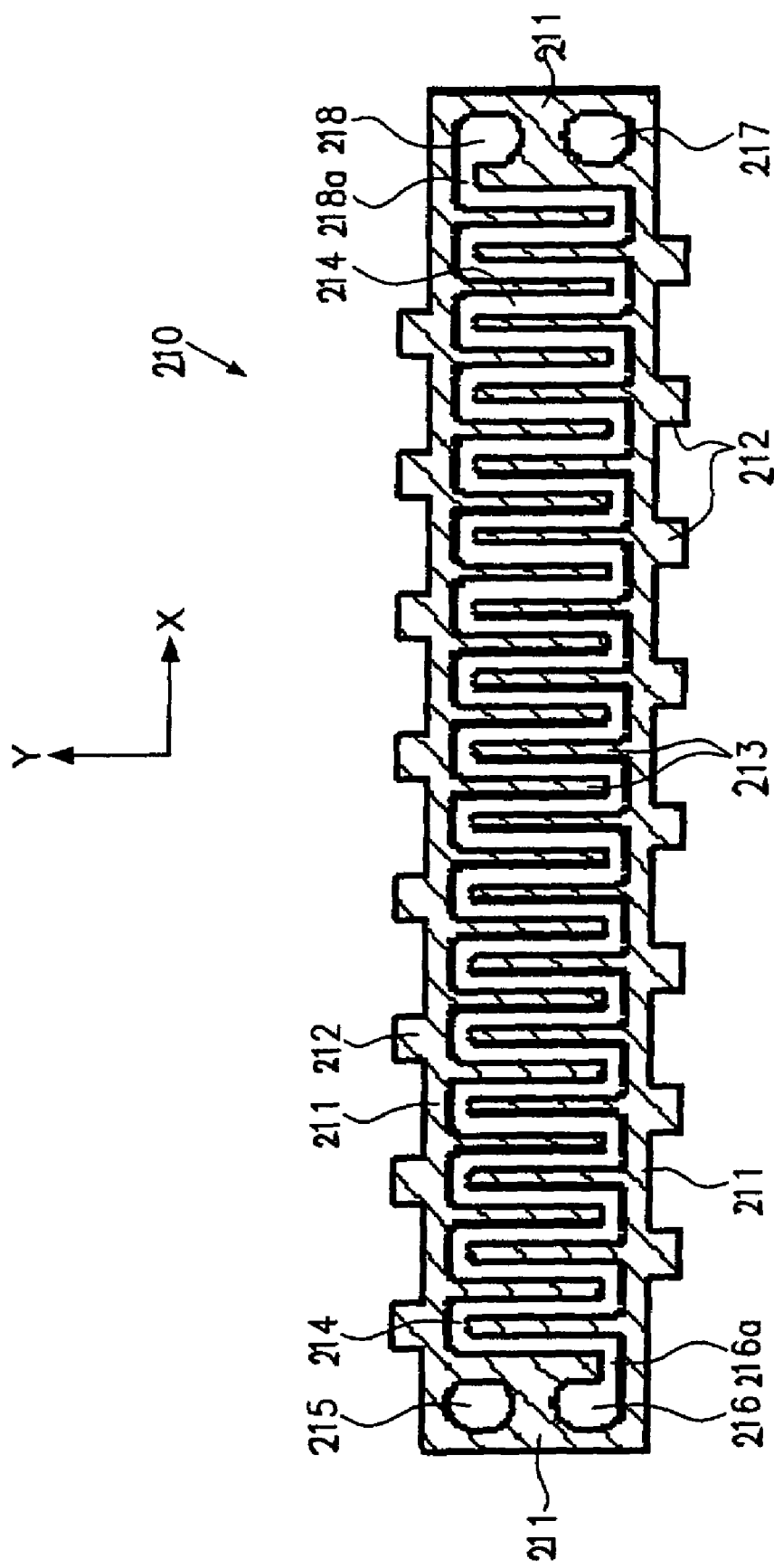
FIG. 7 shows a further plate element which can be used together with the inventive frame elements for building up a monopolar stack.

FIG. 7 shows a further example of a plate element 210 which can be used together with correspondingly configured inventive frame elements (→FIG. 8) for forming a monopolar stack (→FIGS. 9, 10) according to the principles of the present invention.

In plate element 210, both surfaces are electrically conductive and electrically isolated from each other by means of a non-conductive sandwiched intermediate layer. The plate element 210 comprises a surrounding frame portion 211, and ribs 212 extend from two opposite sides of the frame portion 211 to the outside and webs 213 to the inside. The webs 213 do not extend up to the opposite frame side and are alternatingly arranged in such a manner that a meandering channel 214 is defined by the perforations between the webs 213. In the frame portion 211, four bores 215, 216, 217, 218 are also provided, of which two diametrically opposed bores 216 and 218 are connected via through openings 216a and 218a to the meandering channel 214.

When installed into a stack, part of the frame portion 211 and the webs 213 are in electrical contact with the MEA and serve current conduction. At the same time, webs 213 also serve the uniform distribution of fluid over the active surface and the conduction of fluid over said surface. The fluid is supplied via one of the two bores 216, 218, which are connected via the through openings to the meandering channel 214, it flows through said channel 214 and is again discharged through the other bore. Due to the guided flow there are no accumulation regions with reduced fluid exchange, which results in enhanced efficiency. Furthermore, the flow conduction guarantees independence from a relative position during use of the stack, i.e. a reliable function is also ensured in a lateral position or during overhead operation.

In the embodiment which is preferred for monopolar arrangements, the externally extending ribs of the one side are offset relative to the ribs of the other side such that when the illustrated plate element 210 is placed side by side with a further plate element 210 which is rotated by 180° with respect to the x- or y-axis illustrated in the figure and is positioned such that the bores of the two plate elements are in alignment, the ribs of the two plate elements do not get into contact with one another. Upon rotation of the plate element 210 by 180° in the sheet plane in which the bore 217 passes into the bore 215 (and vice versa) and the bore 218 passes into the bore 216 (and vice versa), the externally extending ribs of the one side will not become congruent with the original position of the ribs of the other side, but will be positioned thereinbetween. This configuration permits the use of a single type of plate element for the current discharging means of the whole monopolar stack.

Figure 8:
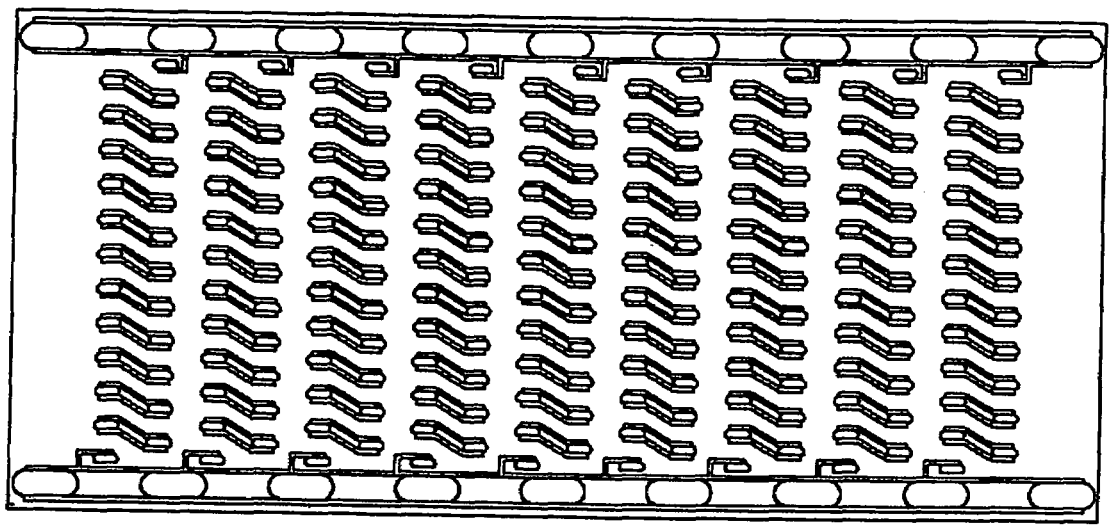
FIG. 8 shows an inventive frame element which can be used together with the plate element sketched in FIG. 7 for building up a monopolar stack.
Figure 8:
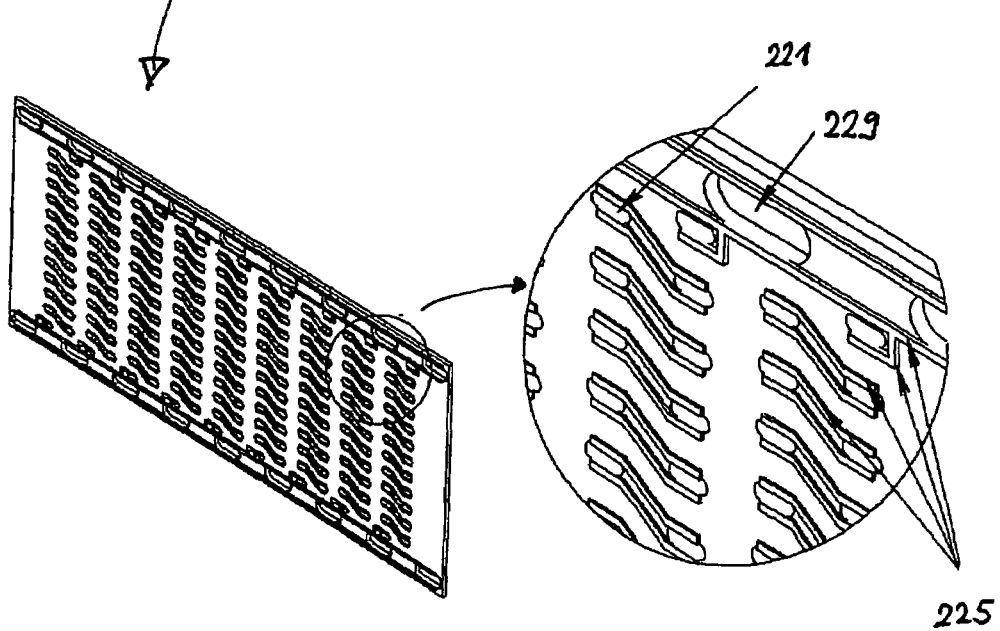

FIG. 8 shows a top view on an embodiment of an inventive frame element 220 which can be used together with the plate elements 210 employed in FIG. 7.

Figure 9:
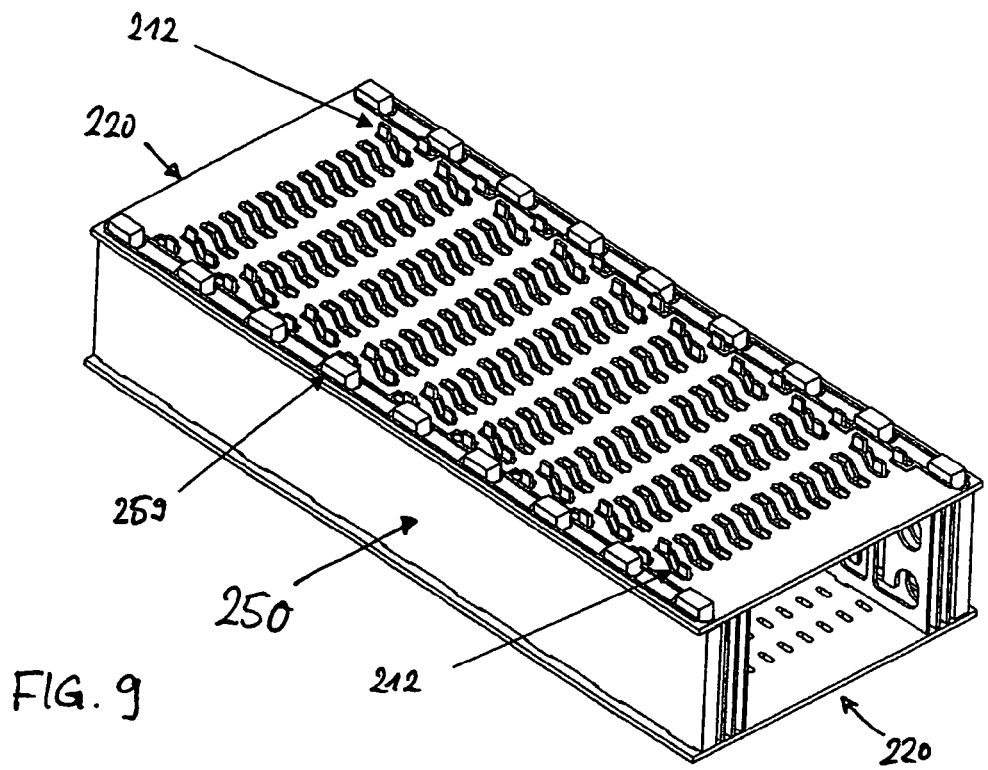
FIG. 9 is a view of an incomplete monopolar stack with the plate and frame elements sketched in FIGS. 7 and 8.
Figure 10:
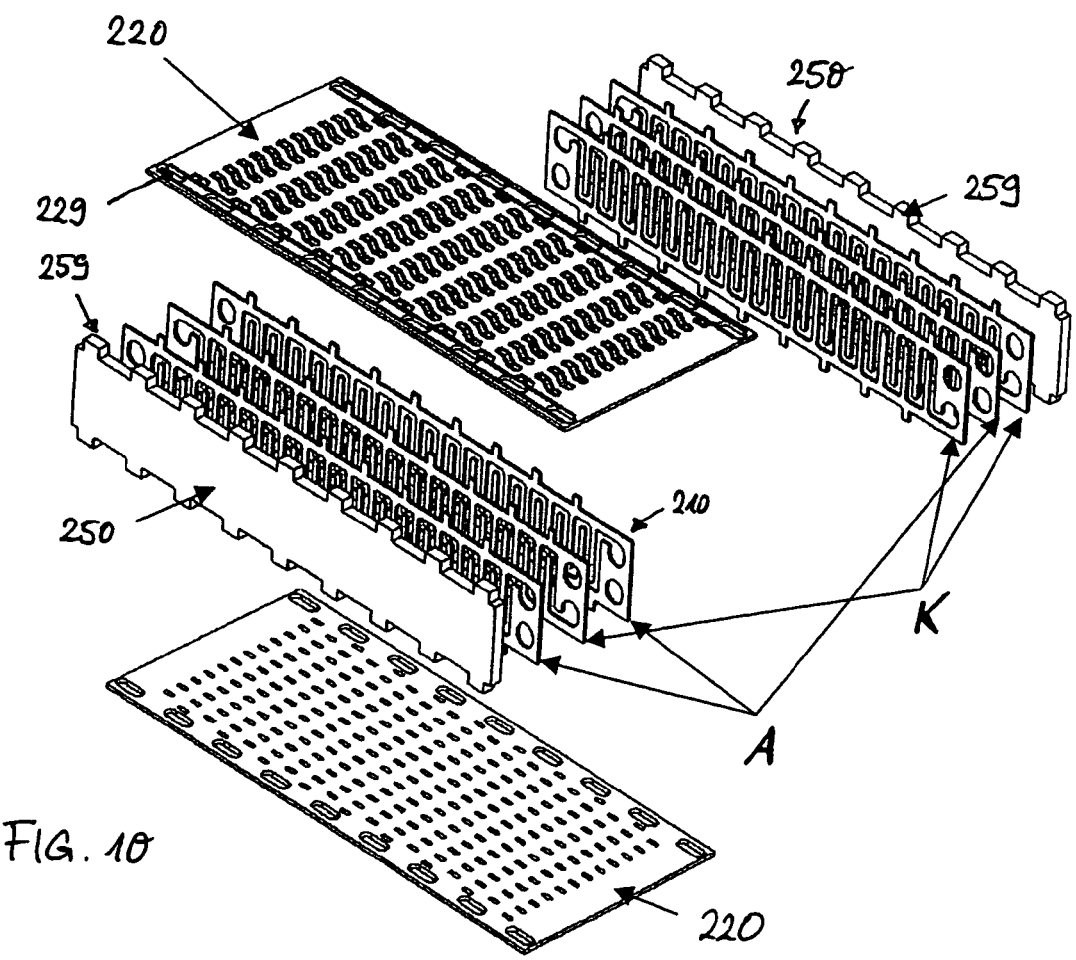
FIG. 10 is an exploded view of the monopolar stack of FIG. 9.
Figure 11:
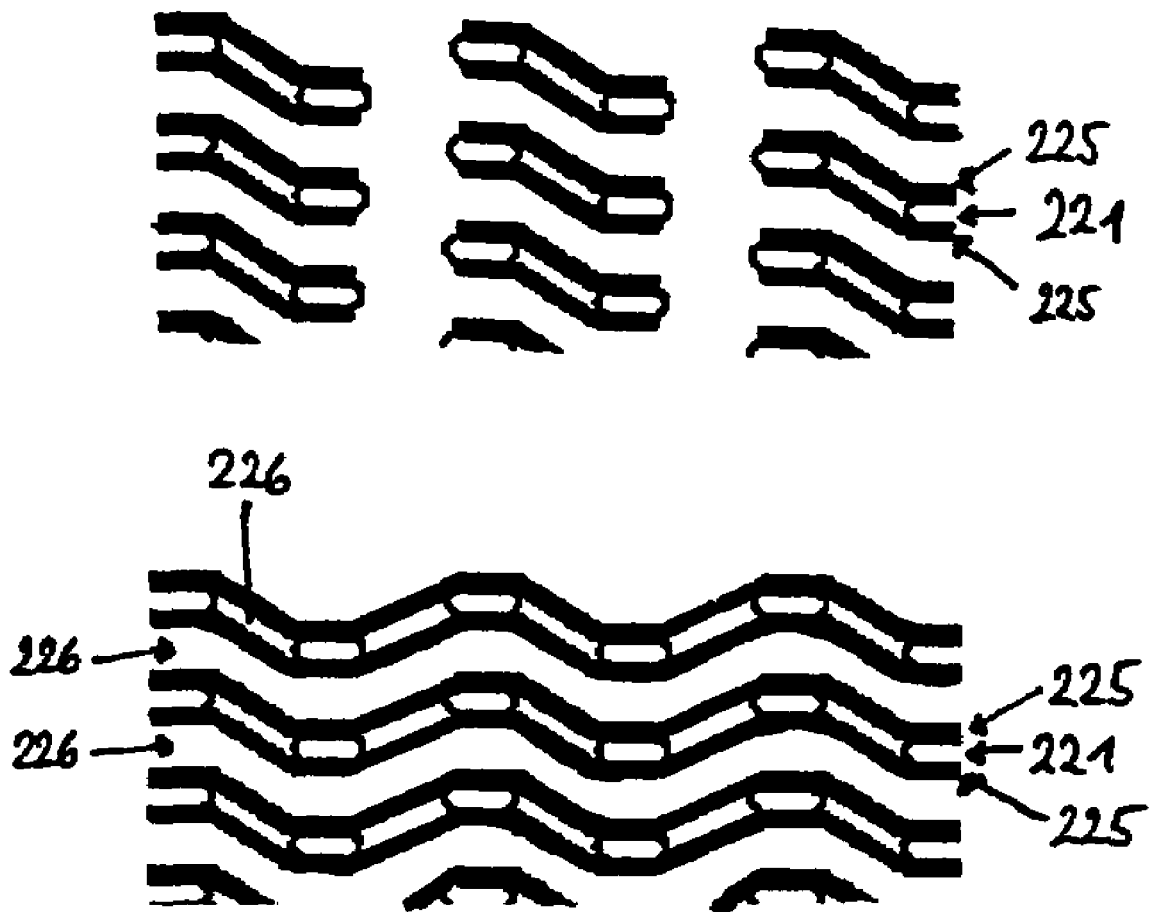
FIG. 11 shows alternative conductivity structures for the inventive frame element of FIG. 8.

The frame element 220 has a regular pattern of perforations 221 which serve to receive the ribs 212 of the plate elements 210 of FIG. 7. One side of the frame element 220 has provided thereon conductor sections 225, each extending between at least two perforations 221, thereby effecting a monopolar wiring of the ribs of the plate elements 210 received by the perforations. The front side and the back side of a rib 212 which are passed through the perforation 221 form a respective anode terminal contact (or cathode terminal contact). Since said pairs of contacts must be electrically isolated from one another, attention must be paid by all means that the corresponding conductor sections 225 are not conductively connected to one another. Furthermore, the frame element 220 comprises openings 229 into which the ribs 259 of end plates 250 can be inserted. As shown in FIGS. 9 and 10, said end plates 250 complete the stack at both sides. Furthermore, through openings are in general provided in the end plate for the supply and discharge of fluid (not shown in the Fig.).

FIG. 10 shows the stack of FIG. 9 in an exploded view. When the stack is built up, the plate element 210 shown in FIG. 7 is used in an alternating orientation so as to form anode regions A (with two anodes each) and cathode regions K (with two cathodes each) according to the cell arrangement shown in FIG. 1 at the bottom.

The conductor pattern shown in FIGS. 8 to 10, which is formed by the conductor sections 225, is only to be understood by way of example. This shall once again be illustrated by FIG. 11. The upper part of the figure corresponds to a conductor structure as realized in FIGS. 8-10. Conductor sections 225 are here provided in pairs to connect two perforations 221. For better illustration the conductor sections 225 have been blackened. As shown in the lower part of FIG. 11, an individual conductor section 225 can also extend along the whole transverse direction (perpendicular to the stack axis), so that two wavelike conductor sections 225 enclose a continuous wavelike insulating region 226 or a wavelike insulating region which is periodically interrupted by perforations 221. Such structures can be produced in a simple way by using conventional printed circuit boards and conventional lithographic methods, which considerably simplifies the wiring of monopolar stacks, which has so far been complicated.

The plate and frame elements can be produced starting from unstructured laminated plates whose one side is conductive and whose other side is insulating. When such laminates are used for the plate elements, the construction of the fuel cell stack can be simplified because separate insulating units need no longer be used. The layer thicknesses of the conductive layer and of an insulating layer may be in the same order. The laminate, however, may also be a metal-coated insulator and an insulation-coated metal in the case of which the thickness of the coating is much smaller than the overall thickness. Printed circuit boards are particularly suited as laminates for the frame elements, on which the desired wiring pattern can be formed by means of lithographic techniques very easily and with utmost precision.

The construction of monopolar fuel cell stacks can be further simplified when the plate element is configured as a laminate consisting of an insulating layer and two conductive layers which sandwich the insulating layer. Such a plate element alone represents the anode portion (or cathode portion) of two neighboring individual cells, the one conductive side forming the anode (or cathode) of the one cell and the other conductive side the anode (or cathode) of the other cell.

When this development is used, electrolyte units and plate elements are alternatingly stacked in a simple way for building up the stack.

The present invention generally provides elements which permit an assembly-friendly construction of monopolar fuel cell stacks that is space- and weight-saving at the same time. They simplify, in particular, electrical wiring and improve properties such as tightness, mechanical strength, etc. at the same time.

The present invention discloses a frame element which predominantly consists of insulating material and in which receiving means (e.g. slots) are provided for the ribs (contact lugs) of the plate elements serving as current discharging means. Electrically conductive connections, such as conductors, are mounted on the frame element such that after having been soldered with the ribs of the current discharging means these electrically wire the monopolar stack and, optionally, mechanically clamp it laterally at the same time. The stack is preferably soldered in a pre-pressed state. The recesses and/or perforations absorb the forces, possibly supported by a plurality of solder points, thereby preserving said pressed state needed for reliable sealing.

The advantages of this invention can be subsumed under three aspects:

1. The complicated electrical wiring of a monopolar stack is extremely simplified by the invention. The conductors mounted on the frame element already predetermine the correct wiring, thereby excluding the risk of a wrong contacting of the plate-element ribs, which serve as current discharging lugs.

2. Owing to the contacting of the plate elements, which serve as current discharging means, via properly mounted conductors, the ribs of the current discharging means which act as contacting lugs need not be arranged in a different way.

Thus all of the required plate elements may have the same geometry, i.e., only one type of plate element is needed that is used in different orientations for building up the stack. This offers the possibility of producing the unit "current discharging means—insulation—current discharging means" from a composite material with the structure "electrically conductive surface—insulating intermediate layer—electrically conductive surface" without any problems arising with respect to contacting in the electrical wiring. The manufacture of such current discharging units (two current discharging means with an insulation thereinbetween) from a suitable composite material entails a reduction of the individual parts from three to one. This reduces the mounting and manufacturing efforts to a minimum and creates the preconditions for producing the parts by way of an inexpensive mass production method, such as stamping.

3. The printed circuit board used for the frame element can be employed as a clamping element of the stack. The soldering of the conductors with the contacting lugs and the end plates additionally establishes a connection by adhesion. The stack is compressed by a suitable device. Two printed circuit boards are mounted in this pressed state at the top and bottom on the stack and are soldered. The individual solder joints absorb the forces after the clamping has been released, thereby maintaining the pressed state. The tensile forces arising are absorbed by a multitude of solder joints, so that the end plates are subjected to considerably less stress than a screwed stack. The material thickness of the end plates can thereby be reduced significantly, whereby the total volume of the stack can be minimized while maintaining the same performance.

The present invention and its advantages have been explained above with reference to preferred embodiments. The scope of protection of the present invention is however solely defined by the following patent claims:

The invention claimed is:

1. A frame element for a monopolar stack, comprising:
a plurality of perforations for passing therethrough ribs of plate elements which are arranged to form a stack,
wherein the frame element is provided at one side with a structure that is electrically conductive in portions, wherein the structure includes conductor sections, each said conductor section extending between at least two perforations such that individual ones of the conductor sections have no contact with any other said conductor section, to provide a monopolar wiring of the ribs of the plate elements received by the perforations.

2. A frame element according to claim 1, comprising perforations for passing therethrough ribs of the plate elements arranged to form a stack, wherein the frame element is provided at one side with a structure which is electrically conductive in portions and which supports a monopolar wiring of the plate elements arranged to form the stack.

3. A frame element according to claim 2, wherein the structure which is electrically conductive in portions comprises a regular pattern.

4. A frame element according to claim 2, comprising:
   a printed circuit board on which the structure is formed that is electrically conductive in portions.

5. A frame element according to claim 1, comprising:
   mounting means for two end plates which complete the stack of plate elements at both sides.

6. A frame element according to claim 1, comprising at least one channel for fluid conduction along a stack axis of the monopolar stack.

7. A method for producing a fuel cell stack, comprising the steps of:
   arranging plate elements in a stack arrangement;
   pre-tensioning the plate elements;
   laterally attaching frame elements on the stack so that the perforations of the frame elements receive ribs of the plate elements; and
   offsetting the pretension;
   wherein each said frame element comprises a plurality of perforations for passing therethrough ribs of the plate elements which are arranged to form the stack; and
   wherein each said frame element is provided at one side with a structure that is electrically conductive in portions, wherein the structure includes conductor sections, each said conductor section extending between at least two perforations such that individual ones of the conductor sections have no contact with any other said conductor section, to provide a monopolar wiring of the ribs of the plate elements received by the perforations.

8. A method according to claim 7, wherein prior to the offsetting of the pretension the ribs of the plate elements are soldered with the frame elements.

9. A frame element according to claim 3, comprising:
   a printed circuit board on which the structure is formed that is electrically conductive in portions.

10. A frame element according to claim 2, comprising:
    mounting means for two end plates which complete the stack of plate elements at both sides.

11. A frame element according to claim 3, comprising:
    mounting means for two end plates which complete the stack of plate elements at both sides.

12. A frame element according to claim 4, comprising:
    mounting means for two end plates which complete the stack of plate elements at both sides.

13. A frame element according to claim 2, comprising at least one channel for fluid conduction along a stack axis of the monopolar stack.

14. A frame element according to claim 3, comprising at least one channel for fluid conduction along a stack axis of the monopolar stack.

15. A frame element according to claim 4, comprising at least one channel for fluid conduction along a stack axis of the monopolar stack.

16. A frame element according to claim 5, comprising at least one channel for fluid conduction along a stack axis of the monopolar stack.

17. A method according to claim 7
    wherein each said frame element further comprises perforations for passing therethrough ribs of the plate elements arranged to form the stack, wherein each said frame element is provided at one side with a structure that is electrically conductive in portions and which supports a monopolar wiring of the plate elements arranged to form the stack.

18. A method accord inn to claim 7 wherein the structure that is electrically conductive in portions comprises a regular pattern.

19. A method according to claim 7
    wherein each said frame element further comprises a printed circuit board on which the structure is formed that is electrically conductive in portions.

20. A method according to claim 7
    wherein each said frame element further comprises mounting means for two end plates that complete the stack of plate elements at both sides.

21. A frame element according to claim 1, further comprising a plurality of recesses for receiving ribs of plate elements arranged to form a stack.

* * * * *